United States Patent
Kalam

(10) Patent No.: US 10,608,455 B2
(45) Date of Patent: Mar. 31, 2020

(54) QUICK BATTERY CHARGING WITH PROTECTION BASED ON REGULATION RELATIVE STATE OF CHARGE

(71) Applicant: Sling Media Pvt. Ltd., Marathahalli, Bangalore (IN)

(72) Inventor: Arun Pulasseri Kalam, Karnataka (IN)

(73) Assignee: Sling Media Pvt. Ltd. (IN)

( * ) Notice: Subject to any disclaimer, the term of this patent is extended or adjusted under 35 U.S.C. 154(b) by 77 days.

(21) Appl. No.: 15/983,464

(22) Filed: May 18, 2018

(65) Prior Publication Data
US 2019/0356135 A1 Nov. 21, 2019

(51) Int. Cl.
*H01M 10/44* (2006.01)
*H01M 10/46* (2006.01)
*H02J 7/00* (2006.01)

(52) U.S. Cl.
CPC ............ *H02J 7/007* (2013.01); *H02J 7/0047* (2013.01); *H02J 7/0029* (2013.01)

(58) Field of Classification Search
CPC ... H02J 7/0021; H02J 7/0047; H02J 2007/005
USPC ........ 320/132, 149, 160; 324/426, 427, 430, 324/433
See application file for complete search history.

(56) References Cited

U.S. PATENT DOCUMENTS

| | | | |
|---|---|---|---|
| 5,179,335 A | 1/1993 | Nor | |
| 5,543,702 A | 8/1996 | Pfeiffer | |
| 5,606,240 A | 2/1997 | Kokuga | |
| 5,606,242 A * | 2/1997 | Hull | H02J 7/0004 320/106 |
| 5,633,573 A * | 5/1997 | van Phuoc | H01M 6/5011 320/128 |
| 6,459,175 B1 * | 10/2002 | Potega | G01R 31/36 307/149 |

(Continued)

FOREIGN PATENT DOCUMENTS

GB 2237696 A 5/1991

OTHER PUBLICATIONS

Thanh Tu Vo, et al., "New charging strategy for lithium-ion batteries based on the integration of Taguchi method and state of charge estimation," Journal of Power Sources, vol. 273 (Jan. 2015), pp. 413-422.

(Continued)

*Primary Examiner* — Edward Tso

(57) ABSTRACT

Techniques are described for quick charging of batteries. For example, a battery charging system can include a battery charger integrated circuit (IC) and a fuel gauge IC coupled between a battery and a central processor to execute a stored multi-phase battery charging protocol. Executing the protocol can include charging the battery in a constant current regulation phase by applying a constant charge current until a charge voltage (e.g., measured by the battery charger IC) reaches a defined regulation voltage that is higher than the nominal voltage of the battery plus the voltage drop across series components of the battery. Protection of the battery during such charging includes monitoring a present relative state of charge (RSOC) of the battery (e.g., by the fuel gauge IC) to detect when the present RSOC reaches a defined regulation RSOC level that may be substantially 100 percent of the charge capacity of the battery.

20 Claims, 4 Drawing Sheets

(56) References Cited

U.S. PATENT DOCUMENTS

| | | |
|---|---|---|
| 7,928,735 B2 | 4/2011 | Huang et al. |
| 9,590,436 B2 | 3/2017 | Sporck |
| 2009/0085527 A1 | 4/2009 | Odaohhara |
| 2009/0146826 A1 | 6/2009 | Gofman et al. |
| 2010/0156356 A1 | 6/2010 | Asakura et al. |
| 2010/0207583 A1 | 8/2010 | Tanaka |
| 2011/0133920 A1 | 6/2011 | Ives |
| 2011/0169459 A1 | 7/2011 | Chen et al. |
| 2011/0316486 A1 | 12/2011 | Inaba |
| 2016/0028255 A1 | 1/2016 | Nishikawa et al. |
| 2016/0064980 A1 | 3/2016 | Jung |
| 2017/0133871 A1 | 5/2017 | Liu |
| 2018/0120383 A1 | 5/2018 | Nishiyama |

OTHER PUBLICATIONS

Simplest possible circuit for charging a li-ion cell, May 13, 2014, 3 pages, retrieved from https://electronics.stackexchange.com/questions/110142/simplest-possible-circuit-for-chargi , Accessed on Aug. 8, 2018.

Constant current lipo charging—can it be done? Apr. 22, 2008, 5 pages, retrieved from https: www.rcgroups.com/forms/showthread.php?853481-Constant-current-lipo-charging- Accessed on Aug. 8, 2018.

International Search Report and Written Opinion for PCT/IN2019/050393 dated Jul. 23, 2019, all pages.

\* cited by examiner

QUICK BATTERY CHARGING WITH PROTECTION BASED ON REGULATION RELATIVE STATE OF CHARGE

FIELD

This invention relates generally to battery charging, and, more particularly, to quick battery charging using overvoltage and relative state-of-charge RSOC detection, and/or other techniques.

BACKGROUND

Mobile devices powered by rechargeable batteries are increasingly becoming ubiquitous. It has become very common for individuals to carry smart phones, laptops, and/or other mobile devices, and those individuals regularly rely on having a charged battery to be able to operate their devices. As battery technologies have developed, advances have been made in battery types, battery capacities, battery charging techniques, and the like. For example, modern rechargeable lithium-ion batteries typically are integrated with one or more integrated circuits that help control the charging of the battery. The integrated circuit(s) can execute a multi-stage charge sequence that seeks to strike a balance between various factors, such as charging speed and protection of the battery. Still, conventional techniques for battery charging tend to be sub-optimal for various applications.

BRIEF SUMMARY

Among other things, embodiments provide novel systems and methods for quick charging of batteries, such as lithium-ion rechargeable batteries. For example, a battery charging system can include a battery charger integrated circuit (IC) and a fuel gauge IC coupled between a battery and a central processor to execute a stored multi-phase battery charging protocol. Executing the battery charging protocol can include charging the battery in at least a constant current regulation phase by applying a constant charge current until a measured charge voltage (e.g., measured by the battery charger IC) reaches a defined regulation voltage that is higher than the nominal voltage of the battery plus the voltage drop across series components of the battery. Protection of the battery during such charging includes monitoring a present relative state of charge (RSOC) of the battery (e.g., by the fuel gauge IC) to detect when the present RSOC reaches a defined regulation RSOC level that may be substantially 100 percent of the charge capacity of the battery.

According to one set of embodiments, a system is provided for quick battery charging. The system includes: a battery charger integrated circuit (IC) to couple with a charging interface of a battery to deliver charging to the battery; a non-transient memory having a battery charging protocol stored thereon that defines a regulation current level, a regulation voltage level, and a regulation RSOC level, wherein the battery charging protocol comprises phases including a constant current regulation phase and a charge termination phase; and a central processor, coupled with the battery charger IC and the fuel gauge IC, to execute at least a portion of the battery charging protocol. The executing includes: receiving a monitor signal indicating a present RSOC of the battery; detecting, responsive to the monitor signal, whether the present RSOC is at the regulation RSOC level; directing the battery charger IC to charge the battery according to at least the constant current regulation phase while the present RSOC is not at the regulation RSOC level according to the detecting; and directing the battery charger IC to proceed to the charge termination phase in response to the present RSOC being at the regulation RSOC level according to the detecting.

According to another set of embodiments, a method is provided for quick battery charging. The method includes executing at least a portion of a battery charging protocol that defines a regulation current level, a regulation voltage level, and a regulation RSOC level, the battery charging protocol comprising phases including a constant current regulation phase and a charge termination phase. The executing includes: receiving a monitor signal indicating a present RSOC of a battery; detecting, responsive to the monitor signal, whether the present RSOC is at the regulation RSOC level; directing charging of the battery according to at least the constant current regulation phase while the present RSOC is not at the regulation RSOC level according to the detecting; and directing termination of the charging of the battery according to the charge termination phase in response to the present RSOC being at the regulation RSOC level according to the detecting.

According to another set of embodiments, a non-transitory processor-readable medium comprising processor-readable instructions that cause a set of processors of a battery charging system to execute at least a portion of a battery charging protocol that defines a regulation current level, a regulation voltage level, and a RSOC level. The battery charging protocol includes phases having at least a constant current regulation phase and a charge termination phase. Executing the at least a portion of the battery charging protocol includes: receiving a monitor signal indicating a present RSOC of a battery; detecting, responsive to the monitor signal, whether the present RSOC is at the regulation RSOC level; directing charging of the battery according to at least the constant current regulation phase while the present RSOC is not at the regulation RSOC level according to the detecting; and directing termination of the charging of the battery according to the charge termination phase in response to the present RSOC being at the regulation RSOC level according to the detecting.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a second label (e.g., a lower-case letter) that distinguishes among the similar components. If only the first reference label is used in the specification, the description is applicable to any one of the similar components having the same first reference label irrespective of the second reference label.

DETAILED DESCRIPTION

Embodiments of the disclosed technology will become clearer when reviewed in connection with the description of the figures herein below. In the following description, numerous specific details are set forth to provide a thorough understanding of the present invention. However, one having ordinary skill in the art should recognize that the invention may be practiced without these specific details. In some instances, circuits, structures, and techniques have not been shown in detail to avoid obscuring the present invention.

Figure 1:
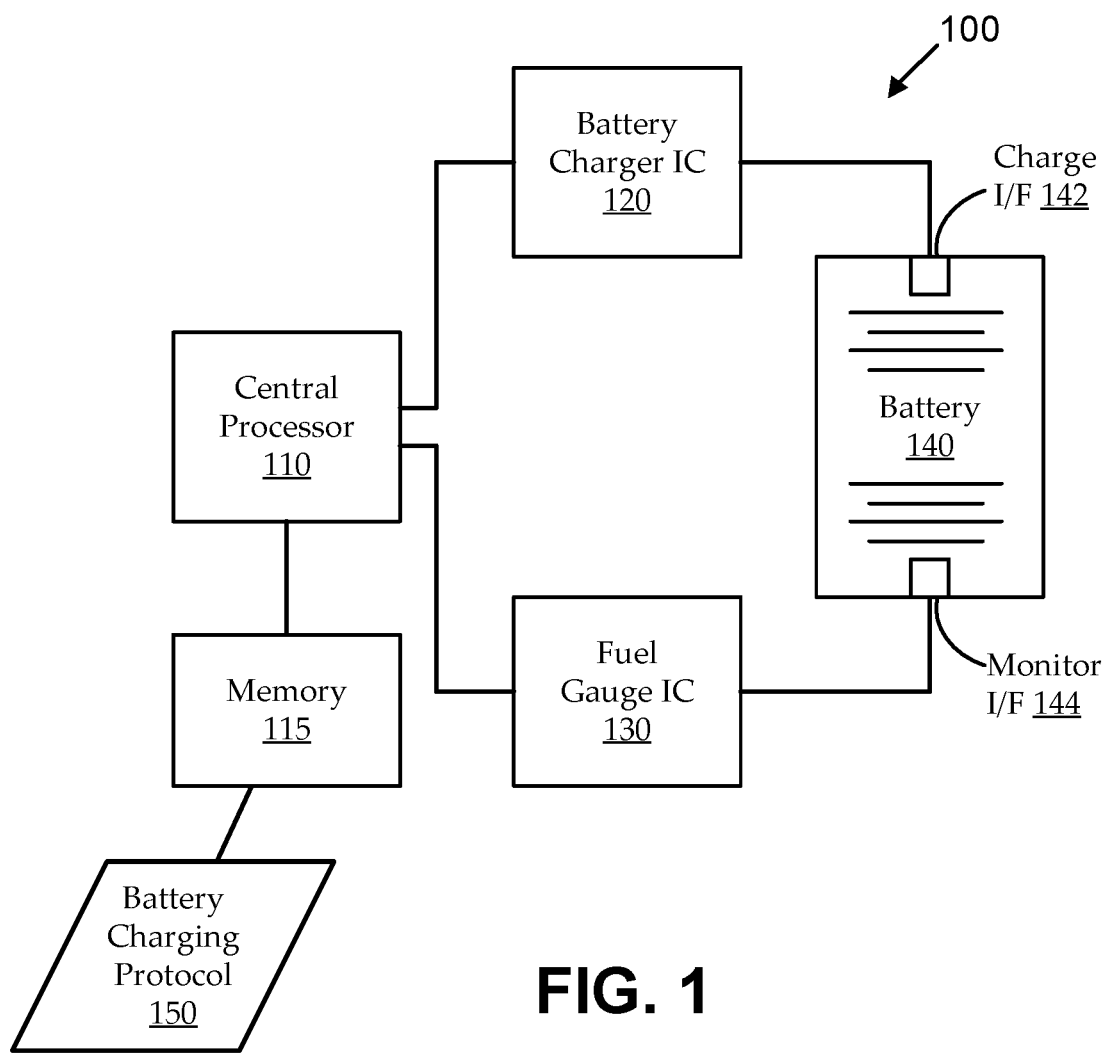
FIG. 1 shows an illustrative battery charging system, according to various embodiments.

FIG. 1 shows an illustrative battery charging system 100, according to various embodiments. The battery charging system 100 includes a battery 140 coupled with a battery charger integrated circuit (IC) 120, and a fuel gauge IC 130. The battery charger integrated circuit (IC) 120, and fuel gauge IC 130 can be coupled with a central processor 110. The central processor 110 (and/or the battery charger IC 120 and/or fuel gauge IC 130) can include, or be in communication with, a memory 115. The battery 140 is a rechargeable battery, such as a lithium-ion rechargeable battery. Some or all of the various components of FIG. 1 are separate and electrically coupled (e.g., via a bus, or the like). For example, the battery charger IC 120 and/or the fuel gauge IC 130 can be in communication with the central processor 110 via an inter-integrated circuit (I2C) bus and/or I2C protocol. Additionally or alternatively, some or all components of FIG. 1 can be integrated. For example, the battery 140 can be integrated with the battery charger IC 120 and/or the fuel gauge IC 130; the central processor 110 can be integrated with the memory 115; etc.

Charging of the battery 140 can follow a particular battery charging protocol 150. In some embodiments, the battery charging protocol 150 is stored in the memory 115 and includes processor-readable instructions. The battery charging protocol 150 can also include various parameters involved in execution of the battery charging protocol 150, such as termination voltage, termination current, etc. When executed, the instructions of the battery charging protocol 150 can cause the central processor 110 to execute the battery charging protocol 150. In other embodiments, the central processor 110 includes, or is implemented as, a state machine, and the battery charging protocol 150 is hard-coded into the operation of the state machine. The battery charging protocol 150 can generally be implemented using any suitable hardware and/or software to direct implementation of elements of the battery charging protocol 150 (e.g., phases, as described below) by the central processor 110, the battery charger IC 120, and the fuel gauge IC 130.

During execution of the battery charging protocol 150, embodiments of the central processor 110 can make determinations relating to the battery charging protocol 150, such as whether and when to halt charging, start charging, etc. based on various parameters it receives from the battery charger IC 120, the fuel gauge IC 130, and the battery charging protocol 150. Also during execution of the battery charging protocol 150, embodiments of the battery charger IC 120 control the various phases of the battery charging in accordance with the battery charging protocol 150 and can report back certain parameters to the central processor 110; and embodiments of the fuel gauge IC 130 monitor various status parameters of the battery 140, such as voltage, current, and temperature, and can report back a relative state of charge (RSOC) (e.g., a value corresponding to a percentage of charge capacity of the battery 140) to the central processor 110. For example, the battery charger IC 120 can be coupled with a charging interface 142 of the battery 140; and the fuel gauge IC 130 can be coupled with a monitoring interface 144 of the battery 140, which can be the same interface as, or a different interface from, the charging interface 142.

Some conventional battery charging approaches measure voltage drop across the battery and series components as an indication of the RSOC of the battery 140. For example, parameters can be monitored by the battery charger IC 120 and reported back to the central processor 110, so that the central processor 110 can determine when and how to move through phases of the battery charging protocol 150. While such approaches can be relatively simple to implement (e.g., and also predictable, inexpensive, etc.), such approaches can be limited. For example, variances in battery components and battery charging components can impact the relationship between measured parameters and RSOC over a large batch of implementations. Further, performance of a battery 140 can change with battery age factors (e.g., time since first use of the battery 140, total time the battery 140 has been in use, number of charge cycles the battery 140 has already gone through, etc.), environmental factors (e.g., temperature, pressure, humidity, etc.), and/or other factors; and such changes in performance can also impact the relationship between monitored electrical characteristics of the battery 140 and its RSOC. Because of the potential variances in relationship between monitored electrical characteristics and RSOC for any given battery 140 over time, such conventional battery charging approaches tend to include protocols that have relatively large safety margins for various charging phases, particularly in fast charging modes. Designing the protocols to include relatively large safety margins can help minimize the risk of undesirable battery charging conditions, such as overcharging, overheating, etc., across large variances, and/or other conditions.

As described more fully below, embodiments described herein provide novel battery charging approaches, including a novel battery charging protocol 150 approach. Embodiments of the novel battery charging protocol 150 operate with smaller safety margins. To maintain safe charging, embodiments described herein use the fuel gauge IC 130 to measure certain parameters of the battery 140 to compute and output an accurate estimate of the RSOC of the battery 140. To arrive at an accurate estimate of RSOC, embodiments of the fuel gauge IC 130 maintain a multidimensional lookup table (or the like) that indicates relationships between monitored electrical characteristics and RSOC in relation to additional variables, such as battery age factors and/or environmental factors. As used herein, a "multidimensional" determination of RSOC is intended generally to refer to any computation or other suitable determination of RSOC that is a function of measured electrical characteristics and at least one additional non-electrical factor (e.g., one or more battery age factor and/or environmental factor).

Some embodiments of the system can include the battery charger IC 120 to couple with a charging interface 142 of the battery 140 to deliver charging to the battery 140; the non-transient memory 115 having the battery charging protocol 150 stored thereon that defines a regulation current level, a regulation voltage level, and a regulation RSOC level, wherein the battery charging protocol comprises a plurality of phases including a constant current regulation phase and a charge termination phase; and a central processor 110, coupled with the battery charger IC 120 and the fuel gauge IC 130, to execute at least a portion of the battery charging protocol 150. As described more fully below, executing the battery charging protocol 150 can include: receiving a monitor signal indicating a present relative state of charge (RSOC) of the battery 140 (e.g., from the fuel gauge IC 130); detecting, responsive to the monitor signal, whether the present RSOC is at the regulation RSOC level; directing the battery charger IC 120 to charge the battery according to at least the constant current regulation phase while the present RSOC is not at the regulation RSOC level according to the detecting; and directing the battery charger IC 120 to proceed to the charge termination phase in response to the present RSOC being at the regulation RSOC level according to the detecting. In some cases, the battery 140 is associated with an installed target voltage corresponding to a nominal voltage of the battery plus a voltage drop across components in series with the battery; and the constant current regulation phase directs delivering of a constant charge current to the battery 140 substantially at the regulation current level until a measured present charge voltage of the battery 140 reaches the regulation voltage level, where the regulation voltage level being higher than the installed target voltage. For example, the installed target voltage is 4.2 volts for a 3.7-volt battery, and the regulation voltage level is set to 4.6 volts. In some embodiments, the battery charging protocol 150 further includes a voltage regulation phase that directs delivering of a constant charge voltage to the battery 140 substantially at the regulation voltage level until the present RSOC of the battery 140 is at the regulation RSOC level according to the detecting. In such embodiments, the central processor 110 can execute at least the portion of the battery charging protocol 150 further by: receiving a measurement signal indicating a present charge voltage of the battery 140 (e.g., from the battery charger IC 120); determining, responsive to the measurement signal, whether the present charge voltage is at the regulation voltage level; and directing the battery charger IC 120 to cease charging the battery 140 according to the constant current regulation phase and to begin charging the battery 140 according to the constant voltage regulation phase in response to determining that the present charge voltage is at the regulation voltage level and the present RSOC is not at the regulation RSOC level.

Figure 2:
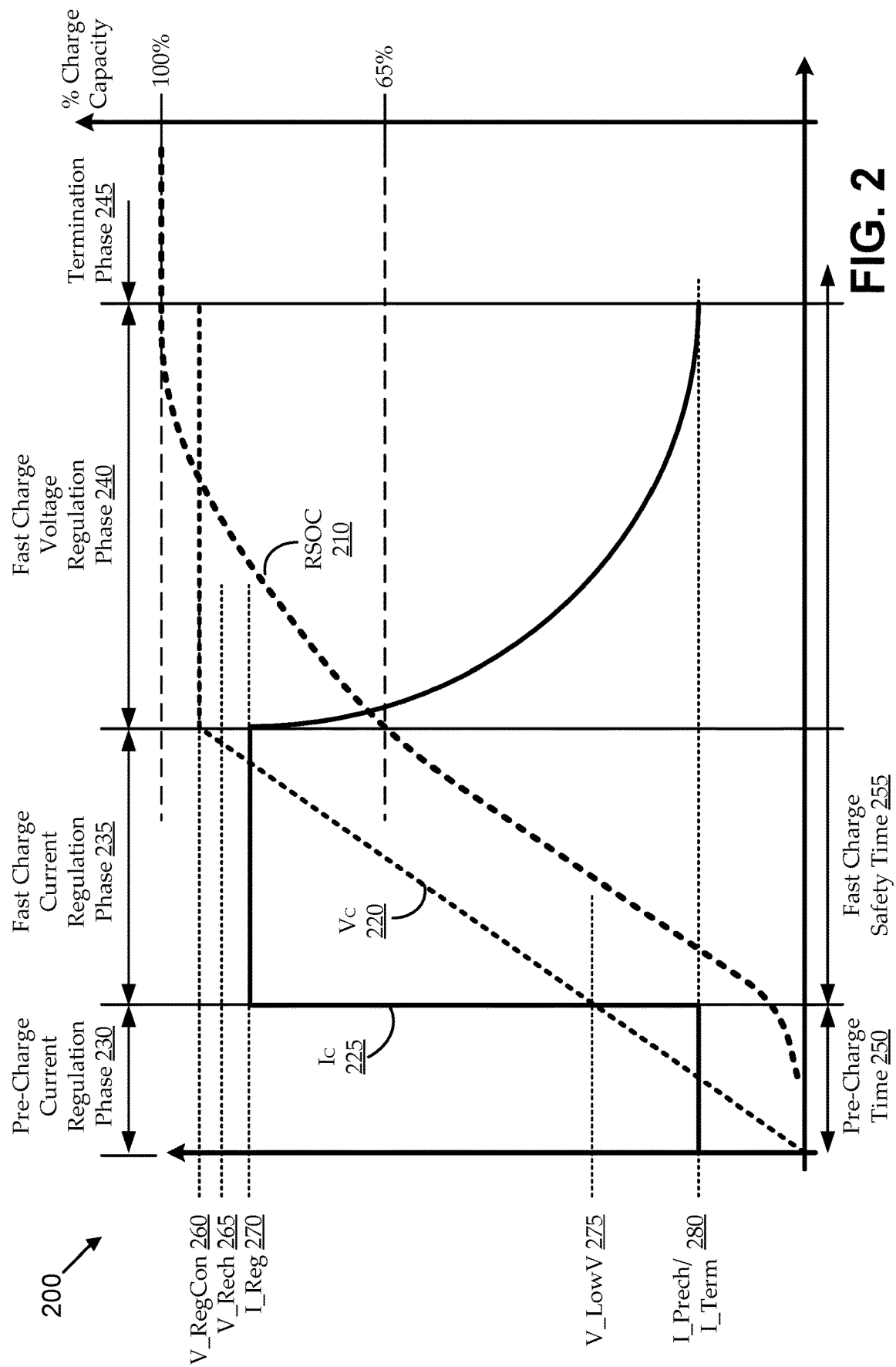
FIG. 2 shows an illustrative plot of a conventional fast charging protocol for a rechargeable battery, such as the battery of FIG. 1.

As described above, a charging protocol for a battery 140, like a lithium-ion rechargeable battery, can include multiple phases and parameters. For the sake of clarity and context, FIG. 2 shows an illustrative plot 200 of a conventional fast charging protocol for a rechargeable battery, such as the battery 140 of FIG. 1. The plot 200 shows a change in applied charge current ($I_C$) 225, applied charge voltage ($V_C$) 220, and RSOC 210 over time. As illustrated, the charging protocol includes a pre-charge current regulation phase 230 (or pre-conditioning phase), a fast charge constant current regulation phase 235, a fast charge voltage regulation phase 240, and a charge termination phase 245. In general, the battery charging protocol 150 can be considered as including a pre-charge time window 250 where needed, which includes the pre-charge current regulation phase 230; and a fast charge safety time window 255, which can include at least the constant current regulation phase 235 and the voltage regulation phase 240. The plot 200 is not intended to be to scale, and durations, magnitudes, and/or other parameters of the plot 200 can be different in other implementations.

The pre-charge current regulation phase 230 is used when the battery 140 is discharged below a predefined cut-off voltage level (e.g., 2.8V). For many applications, it can be rare for the battery 140 to drain below the cut-off voltage; however, in such an event, the pre-charge current regulation phase 230 can be a mandatory phase in certain battery charging protocols. During the pre-charge current regulation phase 230, a predetermined, relatively low charge current 225, indicated as I_Prech 280, is applied to a charging interface of the battery 140. Typically, the I_Prech 280 is substantially equal to a termination current (I_Term), which will be the charge current 225 at the charge termination phase 245. Meanwhile, the charge voltage 220 rises (e.g., substantially linearly) until it reaches a pre-charge threshold voltage level (V_LowV) 275 that corresponds to the cut-off voltage level. The battery charging protocol 150 can then proceed to the constant current regulation phase 235.

The constant current regulation phase 235 is typically the fastest charging phase. At the start of the constant current regulation phase 235, the charge current 225 can jump to a predefined, relatively high current level, indicated as I_Reg 270. Meanwhile, the charge voltage 220 continues to rise (e.g., substantially linearly) until it reaches a conventional constant voltage threshold level (V_RegCon) 260 that corresponds to the voltage level that will be used in the voltage regulation phase 240. For some conventional batteries 140 and battery charging protocols, the constant current regulation phase 235 can charge the battery 140 around 65 percent of its RSOC in less time than it takes to charge the other 35 percent of the battery's 140 RSOC. This is indicated in the plot 200 as the RSOC 210 quickly rising over the constant current regulation phase 235 until it reaches approximately 65 percent at the end of the constant current regulation phase 235.

Conventional battery charging protocols, like the one illustrated by FIG. 2, are designed with V_RegCon 260 set to a value where the RSOC of the battery 140 far from full (e.g., around 60 to 65 percent). As described above, permitting the battery 140 only to reach a partial RSOC 210 (e.g., 65 percent) in the constant current regulation phase 235 can protect the battery 140 from over-charging and/or other undesirable conditions. When V_RegCon 260 is reached (e.g., roughly corresponding to some safe partial RSOC 210), the battery charging protocol 150 can proceed to the voltage regulation phase 240. For example, during the constant current regulation phase 235, a battery charger IC can monitor $V_C$ 220 and report the measurement to a processor. When the processor detects that $V_C$ 220 has reached (e.g., or exceeded, etc.) V_RegCon 260, the processor can direct the battery IC to proceed, according to the charging protocol, to the voltage regulation phase 240.

The voltage regulation phase 240 can be used to safely fill the remaining charge capacity of the battery. As illustrated, the charge voltage 220 remains substantially at the V_RegCon 260 level for the duration of the voltage regulation phase 240. Meanwhile, the charge current 225 reduces (e.g., exponentially) over the duration of the voltage regulation phase 240 to the I_Term level (corresponding substantially to the I_Prech 280 level). As indicated in the plot 200, the RSOC 210 more slowly continues to rise over the voltage regulation phase 240 until it reaches approximately 100 percent of its charge capacity. When the approximately 100 percent of the battery's 140 charge capacity is reached, the battery charging protocol 150 can proceed to the charge termination phase 245, in which charge current 225 and/or charge voltage 220 drop to zero, or the charging otherwise ceases.

To ensure that the battery 140 is charged to maximum charge capacity, the battery charging protocol 150 includes settings for termination voltage (e.g., V_RegCon 260) and termination current based (e.g., I_Term 280) on parameters (e.g., nominal parameters) of the battery 140 being charged. For example, when charging a typical 3.7-volt lithium-ion battery, a conventional battery charging protocol 150 may set the termination voltage to 4.2V to account for the nominal voltage of the battery and approximately a 0.5-volt drop across components in series with the battery. Such a conventional battery charging protocol 150 may also set the termination current to 0.1 C, corresponding to ten percent of the battery capacity. For example, for a battery capacity of 3000 mAH (milliamp-hours), "0.1 C" is 300 mA. With such settings, the battery charging protocol 150 will charge the battery 140 in constant current regulation phase 235 until a voltage drop across the battery 140 and its series components reaches 4.2V. This is shown in FIG. 2 as the charge voltage 220 reaching a V_RegCon 260 of 4.2 volts at the end of the constant current regulation phase 235. Having reached V_RegCon 260, the battery charging protocol 150 can enter the voltage regulation phase 240, in which it can maintain the charge voltage 220 substantially at V_RegCon 260. In some instances, upon entering the voltage regulation phase 240, the charge current 225 will have reached a maximum charge current value of I_Reg 270 (e.g., 3000 mA for a 3000 mAH battery). In the voltage regulation phase 240, the charge current 225 can reduce from I_Reg 270 down to I_Term 280, which can be 0.1 C (e.g., 300 mA for the 3000 mAH battery). When the charge current 225 has dropped to I_Term 280, the battery charging protocol 150 can enter the charge termination phase 245 at which point the charging can effectively be terminated.

Figure 3:
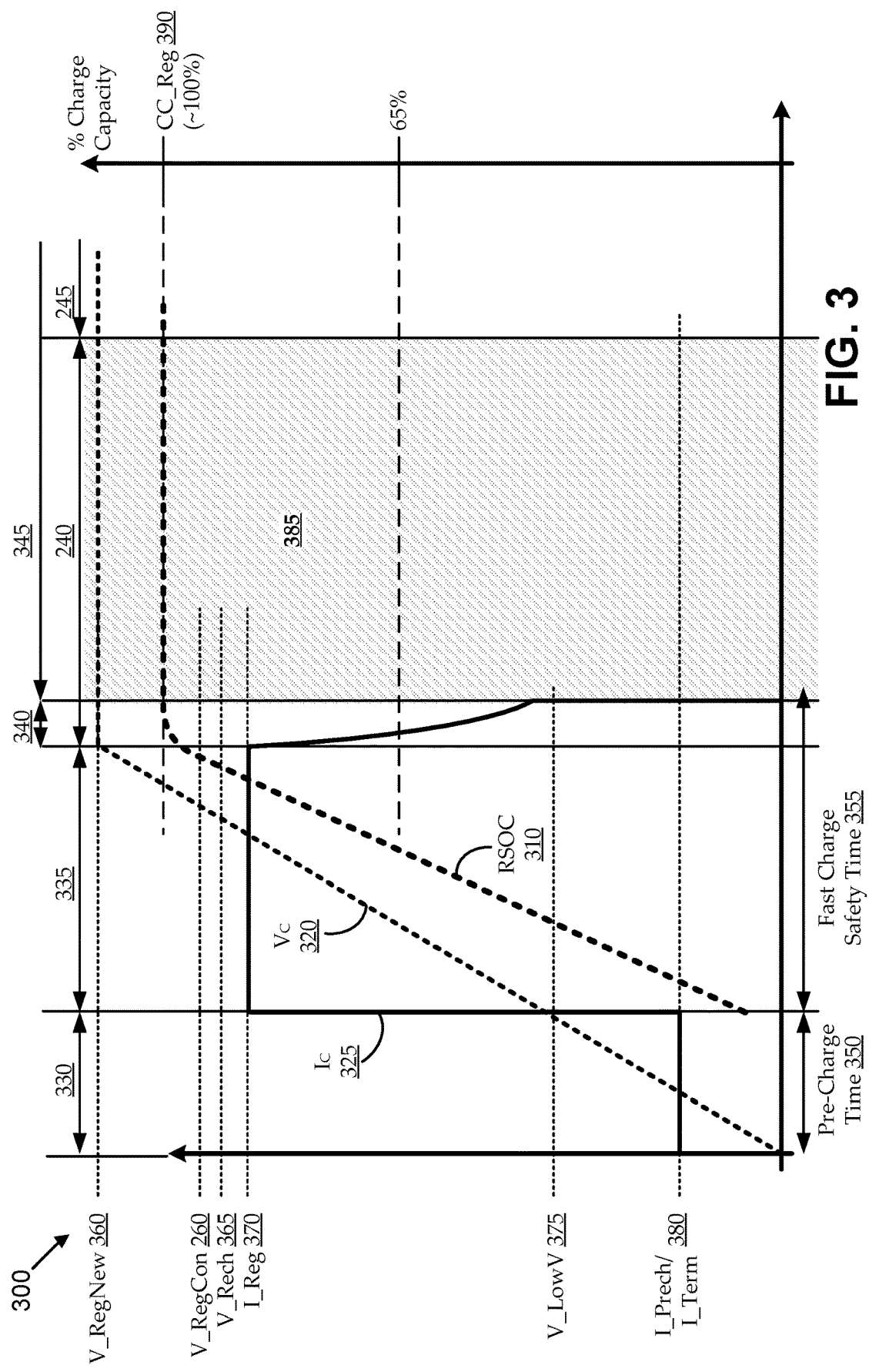
FIG. 3 shows an illustrative plot of a novel fast charging protocol for a battery, according to various embodiments.

As described above, embodiments described herein seek to speed up charging of the battery 140 by keeping the battery charging protocol 150 in the constant current regulation phase 235 for a longer duration. FIG. 3 shows an illustrative plot 300 of a novel fast charging protocol for a battery 140, according to various embodiments. The plot 300 shows a change in applied charge current ($I_C$) 325, applied charge voltage ($V_C$) 320, and RSOC 310 over time according to a battery charging protocol 150. The battery charging protocol 150 includes a pre-charge current regulation phase 330 (or pre-conditioning phase), a fast charge constant current regulation phase 335, a fast charge voltage regulation phase 340, and a charge termination phase 345. In general, the battery charging protocol 150 can be considered as including a pre-charge time window 350 where needed, which includes the pre-charge current regulation phase 330; and a fast charge safety time window 355, which can include at least the constant current regulation phase 335 and the voltage regulation phase 340. The plot 300 is not intended to be to scale, and durations, magnitudes, and/or other parameters of the plot 300 can be different in other implementations.

Some embodiments of the pre-charge current regulation phase 330 and the pre-charge time window 350 are implemented substantially as the pre-charge current regulation phase 230 and the pre-charge time window 250 of FIG. 2. For example, when the battery 140 is discharged below a predefined cut-off voltage level, a relatively low charge current 325 (I_Prech 380) is applied to a charging interface 142 of the battery 140, and the charge voltage 320 rises until it reaches a pre-charge threshold voltage level (V_LowV) 275. The battery charging protocol 150 can then proceed to the constant current regulation phase 335.

At the start of the constant current regulation phase 335, the charge current 325 can jump to a predefined, relatively high current level, indicated as I_Reg 370. The I_Reg 370 can be the same value as, or a different value than, the I_Reg 270 of FIG. 2. Meanwhile, the charge voltage 220 continues to rise (e.g., substantially linearly) until it reaches a target constant voltage threshold level (V_RegNew) 360 that is appreciably higher than the V_RegCon 260 of a conventional approach (e.g., as illustrated in FIG. 2). According to some embodiments, the central processor 110 indicates (e.g., to the battery charger IC 120) a V_RegNew 360 set by the battery charging protocol 150 to a high enough level, such that the battery charger IC 120 will not move into further phases of the charge cycle until the RSOC 310 reaches a level at or near CC_Reg 390. As indicated, CC_Reg 390 is a RSOC level close to 100 percent of charge capacity (e.g., approximately 95 percent, 99 percent, 100 percent, etc.). Meanwhile, the fuel gauge IC 130 can accurately monitor the RSOC 310 of the battery 140 and report the RSOC 310 back to the central processor 110. The central processor 110 can detect when the reported RSOC 310 has reached (e.g., or exceeded, etc.) CC_Reg 390.

If, at some point during the constant current regulation phase 335, the RSOC 310 is reported to have reached or exceeded CC_Reg 390, embodiments can immediately move to the charge termination phase 345 and discontinue further charging. For example, the central processor 110 can detect such a condition and can direct the battery charger IC 120 to terminate charging. This can help ensure that the battery 140 is protected from overcharging, etc. If the end of the constant current regulation phase 335 is reached (e.g., the charge voltage 320 has reached V_RegNew 360), and the RSOC 310 has not yet reached CC_Reg 390 (i.e., which may be the typical case in some implementations), the battery charging protocol 150 can proceed to the voltage regulation phase 340.

In the event that the battery charging protocol 150 moves into the voltage regulation phase 340, the RSOC 310 of the battery 140 has risen to a level close to CC_Reg 390. As such, the charge cycle is likely to spend very little time in the voltage regulation phase 340. The voltage regulation phase 340 can be used to safely fill the small amount of remaining charge capacity of the battery 140. As illustrated, the charge voltage 320 remains substantially at the V_RegNew 360 level for the duration of the voltage regulation phase 340, and the charge current 325 reduces toward the I_Term level (corresponding substantially to the I_Prech 380 level). As indicated in the plot 300, the RSOC 310 more slowly continues to rise, until a reported RSOC 310, as monitored by the fuel gauge IC 130 (e.g., accounting for a multidimensional determination, as described above), reaches CC_Reg 390 (approximately 100 percent of the full capacity of the battery 140). When CC_Reg 390 is reached, the battery charging protocol 150 can proceed to the charge termination phase 245, in which charge current 225 and/or charge voltage 220 drop to zero, or the charging otherwise ceases.

As described above, conventional battery charging protocols, such as the one described in FIG. 2, can determine when the terminate charging in response to measurements of an electrical parameter. For example, when a charge current measured by a battery charger IC drops to the I_Term level, the protocol terminates charging. In such conventional approaches, V_RegCon 260 is set at a level to provide a substantially large safety margin, for example, by moving into the slower voltage regulation phase when the RSOC is only around 60 or 65 percent of charge capacity. The novel battery charging protocol 150 illustrated in FIG. 3 can remaining in the constant current regulation phase 335 for an appreciably larger portion of the charge cycle, while continuing to protect the battery 140 from overcharging monitoring and reporting RSOC 310 directly by the fuel gauge IC 130.

For example, as illustrated, the battery charging protocol 150 can proceed to the voltage regulation phase 340 when the RSOC 310 has risen to close to CC_Reg 390. By that point, the RSOC 310 is nearly at 100 percent, and the voltage regulation phase 340 can be relatively very short, or even non-existent. The voltage regulation phase 240 and charge termination phase 245 of FIG. 2 are shown for the sake of comparison (not to indicate actual scale). As illustrated, the voltage regulation phase 340 of FIG. 3 is appreciably shorter than the voltage regulation phase 240 of FIG. 2, and the charge termination phase 245 can occur shortly after the end of the constant current regulation phase 335. Such an approach can appreciably shorten the charge time, as generally illustrated by shaded region 385 (i.e., indicating the difference between the start of the charge termination phase 245 of FIG. 2 and the start of the charge termination phase 345 of FIG. 3).

As an example, consider a battery 140 having a capacity of 3000 mAH, a maximum charge current of "1 C" (e.g., 3000 mA), and a nominal voltage of 3.7 volts. The termination voltage, V_RegNew 360 in FIG. 3, can be set to 4.6 volts (e.g., higher than the 4.2 volt level used in the example referring to FIG. 2). In this example, the termination current can be kept at 0.1 C, as in the example referring to FIG. 2. Notably, the cells of the battery 140 never reach 4.6 volts, as there is some voltage drop (e.g., 0.5 volts, or the like) across series components. As illustrated, during the constant current regulation phase 335, the RSOC 310 quickly rises to a level very close to 100 percent of the full capacity of the battery 140. The charging then moves into the voltage regulation phase 240, where the small remaining capacity is filled. At some point (corresponding to the boundary between the voltage regulation phase 340 and the charge termination phase 345), the fuel gauge IC 130 reports a RSOC 310 substantially at the level of CC_Reg 390, and the central processor 110 directs termination of the charging.

Figure 4:
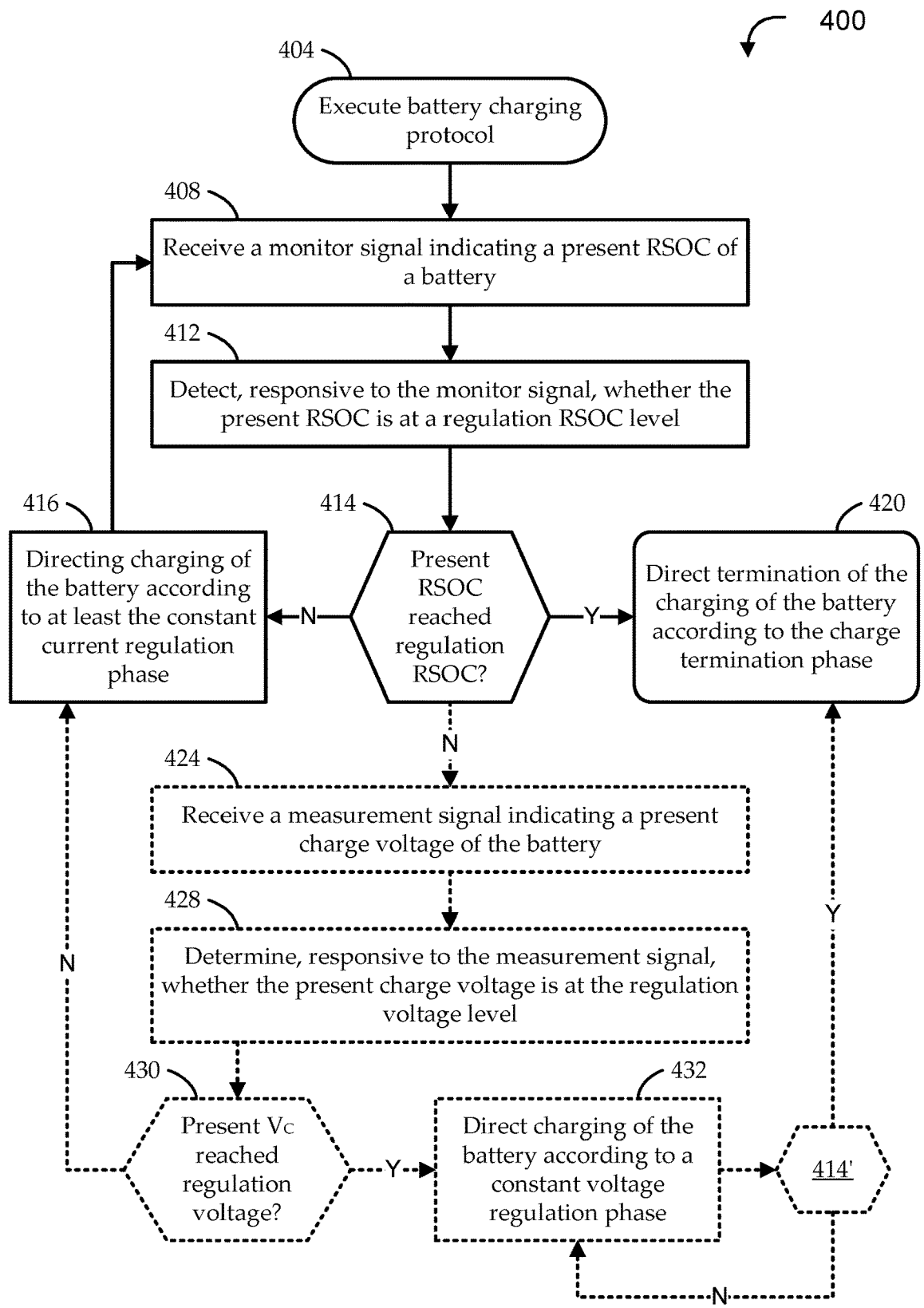
FIG. 4 shows a flow diagram of an illustrative method for quick battery charging, according to various embodiments.

FIG. 4 shows a flow diagram of an illustrative method 400 for quick battery charging, according to various embodiments. Embodiments of the method 400 begin at stage 404 with executing at least a portion of a battery charging protocol. The battery charging protocol defines a regulation current level, a regulation voltage level, and a regulation RSOC level. The battery charging protocol also includes a number of phases, such as a constant current regulation phase and a charge termination phase.

At stage 408, embodiments can receive a monitor signal indicating a present RSOC of a battery. For example, the monitor signal can be received continuously, periodically, or in any other suitable manner. At stage 412, embodiments can detect, responsive to the monitor signal, whether the present RSOC is at the regulation RSOC level. For example, a determination is made at block 414 as to whether the present RSOC has reached the regulation RSOC level (e.g., is substantially equal to, has exceeded, etc.). While the determination at block 414 indicates that the present RSOC is not at the regulation RSOC level, embodiments can direct charging of the battery according to at least the constant current regulation phase at stage 416. In some implementations, the battery is a rechargeable battery (e.g., a lithium ion battery) associated with an installed target voltage corresponding to a nominal voltage of the battery plus a voltage drop across components in series with the battery. For example, the nominal voltage of the battery is 3.7 volts, and there is approximately a 0.5-volt drop across components in series with the battery, such that the installed target voltage is set to 4.2 volts. The constant current regulation phase directs delivering of a constant charge current to the battery substantially at the regulation current level until a measured present charge voltage of the battery reaches the regulation voltage level defined by the battery charging protocol. In such implementations, the regulation voltage level is higher than the installed target voltage (e.g., the regulation voltage level is 4.6 volts). If the determination at block 414 indicates that the present RSOC is at the regulation RSOC level, embodiments can direct termination of the charging of the battery according to the charge termination phase at stage 420. For example, embodiments can direct termination of the charging at stage 420 immediately upon detecting that the present RSOC is at the regulation RSOC level.

In some embodiments, the phases of the battery charging protocol further include a voltage regulation phase that directs delivering of a constant charge voltage to the battery substantially at the regulation voltage level until the present RSOC of the battery is at the regulation RSOC level. Such embodiments can further receive a measurement signal indicating a present charge voltage of the battery at stage 424; and can further determine, responsive to the measurement signal, whether the present charge voltage is at the regulation voltage level at stage 428. For example, a determination is made at block 430 as to whether the present charge voltage has reached the regulation voltage level (e.g., is substantially equal to, has exceeded, etc.). Some such embodiments only begin and/or continue to direct charging the battery according to the constant current regulation phase in stage 416 while the present RSOC is not at the regulation RSOC level (per block 414) and the present charge voltage is not at the regulation voltage level (per block 430). If the present RSOC is not at the regulation RSOC level, but the present charge voltage has reached the regulation voltage level, some embodiments can, at stage 432, directing ceasing of charging the battery according to the constant current regulation phase and beginning of charging the battery according to the constant voltage regulation phase. Once in the constant voltage regulation phase, embodiments can continue to detect whether the present RSOC has reached the regulation RSOC level (shown as block 414'). If not, embodiments can continue directing charging in accordance with the constant voltage regulation phase. If so, embodiments can direct termination of the charging of the battery according to the charge termination phase at stage 420.

Embodiments of the method 400 can be implemented in any suitable manner. In some embodiments, the method 400 can be implemented by one or more processors. For example, some or all of the steps of the method can be implemented by the central processor 110 via interactions with one or more of the battery charger IC 120, the fuel cell IC, the memory 115, and/or the battery 140 of FIG. 1. The implementations can involve any suitable hardware and/or software elements. For example, steps of the method 400 can be implemented as code and/or instructions executable by one or more processors, and such code and/or instructions can be used to configure and/or adapt the processor(s) to perform one or more operations in accordance with the described method 400. In some implementations, the instructions and/or codes are stored on a non-transitory processor-readable storage medium, which may be incorporated within one of the processors, in a separate processor, in a computational system, or in any other suitable manner. In such implementations, instructions stored on the storage medium, when executed, can cause the one or more processors to perform steps of the method 400. Any suitable type of processor-readable medium, processor-readable instructions, or the like can be used.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of example configurations (including implementations). However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a flow diagram or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the invention. Also, a number of steps may be undertaken before, during, or after the above elements are considered.

What is claimed is:

1. A system for quick battery charging, the system comprising:
   a battery charger integrated circuit (IC) to couple with a charging interface of a battery to deliver charging to the battery;
   a non-transient memory having a battery charging protocol stored thereon that defines a regulation current level, a regulation voltage level, and a regulation relative state of charge (RSOC) level,
   wherein the battery charging protocol comprises a plurality of phases including a constant current regulation phase and a charge termination phase; and
   a central processor, coupled with the battery charger IC and a fuel gauge IC, to execute at least a portion of the battery charging protocol by:
   receiving a monitor signal indicating a present RSOC of the battery;
   detecting, responsive to the monitor signal, whether the present RSOC is at the regulation RSOC level;
   directing the battery charger IC to charge the battery according to at least the constant current regulation phase while the present RSOC is not at the regulation RSOC level according to the detecting; and
   directing the battery charger IC to proceed to the charge termination phase in response to the present RSOC being at the regulation RSOC level according to the detecting.

2. The system of claim 1, wherein:
   the battery is a rechargeable battery associated with an installed target voltage corresponding to a nominal voltage of the battery plus a voltage drop across components in series with the battery; and
   the constant current regulation phase directs delivering of a constant charge current to the battery substantially at the regulation current level until a measured present charge voltage of the battery reaches the regulation voltage level, the regulation voltage level being higher than the installed target voltage.

3. The system of claim 1, wherein:
   the plurality of phases of the battery charging protocol further comprises a voltage regulation phase that directs delivering of a constant charge voltage to the battery substantially at the regulation voltage level until the present RSOC of the battery is at the regulation RSOC level according to the detecting;
   the central processor executes at least the portion of the battery charging protocol further by:
   receiving a measurement signal indicating a present charge voltage of the battery;
   determining, responsive to the measurement signal, whether the present charge voltage is at the regulation voltage level; and
   directing the battery charger IC to cease charging the battery according to the constant current regulation phase and to begin charging the battery according to the constant voltage regulation phase in response to determining that the present charge voltage is at the regulation voltage level and the present RSOC is not at the regulation RSOC level.

4. The system of claim 3, wherein:
   the battery charger IC measures the present charge voltage of the battery and generates the measurement signal; and
   the central processor receives the measurement signal from the battery charger IC.

5. The system of claim 1, further comprising:
   the fuel gauge IC to monitor the present RSOC of the battery and generate the monitor signal,
   wherein the central processor receives the monitor signal from the fuel gauge IC.

6. The system of claim 5, wherein:
   the fuel gauge IC monitors the present RSOC of the battery according to a multidimensional determination that is a function of at least one measured electrical parameter of the battery and at least one non-electrical parameter of the battery.

7. The system of claim 5, wherein:
at least one of the battery charger IC or the fuel gauge IC is integrated with the central processor.

8. The system of claim 5, further comprising:
the battery,
wherein at least one of the battery charger IC or the fuel gauge IC is integrated with the central processor.

9. The system of claim 1, wherein the non-transient memory is integrated with the central processor.

10. The system of claim 1, wherein the plurality of phases of the battery charging protocol further comprises a pre-charge current regulation phase.

11. The system of claim 1, further comprising the battery.

12. The system of claim 1, wherein the battery is a lithium-ion battery.

13. A method for quick battery charging, the method comprising:
executing at least a portion of a battery charging protocol that defines a regulation current level, a regulation voltage level, and a regulation relative state of charge (RSOC) level, the battery charging protocol comprising a plurality of phases including a constant current regulation phase and a charge termination phase, such that the executing comprises:
receiving a monitor signal indicating a present RSOC of a battery;
detecting, responsive to the monitor signal, whether the present RSOC is at the regulation RSOC level;
directing charging of the battery according to at least the constant current regulation phase while the present RSOC is not at the regulation RSOC level according to the detecting; and
directing termination of the charging of the battery according to the charge termination phase in response to the present RSOC being at the regulation RSOC level according to the detecting.

14. The method of claim 13, wherein:
the battery is a rechargeable battery associated with an installed target voltage corresponding to a nominal voltage of the battery plus a voltage drop across components in series with the battery; and
the constant current regulation phase directs delivering of a constant charge current to the battery substantially at the regulation current level until a measured present charge voltage of the battery reaches the regulation voltage level, the regulation voltage level being higher than the installed target voltage.

15. The method of claim 13, wherein:
the plurality of phases of the battery charging protocol further comprises a voltage regulation phase that directs delivering of a constant charge voltage to the battery substantially at the regulation voltage level until the present RSOC of the battery is at the regulation RSOC level according to the detecting; and
the executing further comprises:
receiving a measurement signal indicating a present charge voltage of the battery;
determining, responsive to the measurement signal, whether the present charge voltage is at the regulation voltage level; and
directing ceasing of charging the battery according to the constant current regulation phase and beginning of charging the battery according to the constant voltage regulation phase in response to determining that the present charge voltage is at the regulation voltage level and the present RSOC is not at the regulation RSOC level.

16. The method of claim 13, wherein the plurality of phases of the battery charging protocol further comprises a pre-charge current regulation phase.

17. A non-transitory processor-readable medium comprising processor-readable instructions that cause a set of processors of a battery charging system to execute at least a portion of a battery charging protocol that defines a regulation current level, a regulation voltage level, and a regulation relative state of charge (RSOC) level, the battery charging protocol comprising a plurality of phases including a constant current regulation phase and a charge termination phase, such that executing the at least a portion of a battery charging protocol comprises:
receiving a monitor signal indicating a present RSOC of a battery;
detecting, responsive to the monitor signal, whether the present RSOC is at the regulation RSOC level;
directing charging of the battery according to at least the constant current regulation phase while the present RSOC is not at the regulation RSOC level according to the detecting; and
directing termination of the charging of the battery according to the charge termination phase in response to the present RSOC being at the regulation RSOC level according to the detecting.

18. The non-transitory processor-readable medium of claim 17, wherein:
the battery is a rechargeable battery associated with an installed target voltage corresponding to a nominal voltage of the battery plus a voltage drop across components in series with the battery; and
the constant current regulation phase directs delivering of a constant charge current to the battery substantially at the regulation current level until a measured present charge voltage of the battery reaches the regulation voltage level, the regulation voltage level being higher than the installed target voltage.

19. The non-transitory processor-readable medium of claim 17, wherein:
the plurality of phases of the battery charging protocol further comprises a voltage regulation phase that directs delivering of a constant charge voltage to the battery substantially at the regulation voltage level until the present RSOC of the battery is at the regulation RSOC level according to the detecting; and
the executing the at least a portion of a battery charging protocol further comprises:
receiving a measurement signal indicating a present charge voltage of the battery;
determining, responsive to the measurement signal, whether the present charge voltage is at the regulation voltage level; and
directing ceasing of charging the battery according to the constant current regulation phase and beginning of charging the battery according to the constant voltage regulation phase in response to determining that the present charge voltage is at the regulation voltage level and the present RSOC is not at the regulation RSOC level.

20. The non-transitory processor-readable medium of claim 17, wherein the set of processors comprises a central processor, a battery charger integrated circuit, and a fuel gauge integrated circuit.

* * * * *